(12) United States Patent
Kamitani et al.

(10) Patent No.: US 8,616,797 B2
(45) Date of Patent: Dec. 31, 2013

(54) THERMOSENSITIVE DECOLORABLE INK COMPOSITION

(75) Inventors: Toshimi Kamitani, Fujioka (JP); Hiroyuki Okuyama, Fujioka (JP)

(73) Assignee: Mitsubishi Pencil Company, Ltd., Shinagawa-Ku, Tokyo (JP)

( * ) Notice: Subject to any disclaimer, the term of this patent is extended or adjusted under 35 U.S.C. 154(b) by 0 days.

(21) Appl. No.: 13/257,363

(22) PCT Filed: Mar. 25, 2010

(86) PCT No.: PCT/JP2010/055199
§ 371 (c)(1),
(2), (4) Date: Sep. 19, 2011

(87) PCT Pub. No.: WO2010/110359
PCT Pub. Date: Sep. 30, 2010

(65) Prior Publication Data
US 2012/0014740 A1    Jan. 19, 2012

(30) Foreign Application Priority Data
Mar. 27, 2009 (JP) ................................ 2009-079745

(51) Int. Cl.
*B43K 7/00* (2006.01)
*C09D 11/18* (2006.01)

(52) U.S. Cl.
USPC .......................................... 401/209; 523/161

(58) Field of Classification Search
None
See application file for complete search history.

(56) References Cited

U.S. PATENT DOCUMENTS

| | | | |
|---|---|---|---|
| 5,922,115 A | 7/1999 | Sano et al. | |
| 6,010,808 A * | 1/2000 | Naito et al. | 430/19 |
| 6,313,066 B1 | 11/2001 | Takayama | |
| 6,790,809 B2 * | 9/2004 | Suzuki | 503/201 |
| 2002/0143080 A1 | 10/2002 | Yui et al. | |
| 2003/0064890 A1 | 4/2003 | Suzuki | |

FOREIGN PATENT DOCUMENTS

| | | |
|---|---|---|
| JP | 7-33997 A | 2/1995 |
| JP | 8-39936 A | 2/1996 |
| JP | 10-88046 A | 4/1998 |
| JP | 2000-19770 A | 1/2000 |
| JP | 2000-284520 A | 10/2000 |
| JP | 2001-271011 A | 10/2001 |
| JP | 2002-294104 A | 10/2002 |
| JP | 2003-176419 A | 6/2003 |
| JP | 2006-63238 A | 3/2006 |
| JP | 2008-280440 A | 11/2008 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Nov. 24, 2011, in the corresponding International Application No. PCT/JP2010/055199. (7 pages).
International Search Report (PCT/ISA/210) issued on Jun. 29, 2010, by Japanese Patent Office as the International Searching Authority for International Application No. PCT/JP2010/055199.

* cited by examiner

*Primary Examiner* — Vu A Nguyen
(74) *Attorney, Agent, or Firm* — Buchanan Ingersoll & Rooney, PC

(57) ABSTRACT

In order to provide a thermosensitive decolorable ink composition which can readily be decolored with simple heating by rubbing and the like without using a microcapsule and is not developed again in color even after stored at very low temperature (−50° C. or lower) and which is excellent in stability with passage of time and has a vivid hue intensity, the above thermosensitive decolorable ink composition is provided with a constitution in which it contains as a colorant, color developing particles comprising at least a leuco dye, a developer and a crystalline substance and in which it further contains a decolorant comprising an amorphous resin.

8 Claims, No Drawings

THERMOSENSITIVE DECOLORABLE INK COMPOSITION

TECHNICAL FIELD

The present invention relates to a thermosensitive decolorable ink composition prepared by making use of a developing and decoloring mechanism of a leuco dye, more specifically to a thermosensitive decolorable ink composition which can readily be decolored with simple heating by rubbing and the like without using a microcapsule and is not developed again in color even after stored at very low temperature (−50° C. or lower) and which is excellent in stability with passage of time and has a vivid hue intensity.

BACKGROUND ART

Thermosensitive decolorable ink compositions prepared by making use of a developing and decoloring mechanism of a leuco dye have so far been known in large numbers.

Known are, for example, a decolorable or discolorable aqueous ink characterized by containing a colorant for an aqueous ink which is decolorable by a solvent or heating, wherein the colorant comprises fine powder comprising at least a leuco dye, developer, a decolorant and a resin in which either lower temperature out of a glass transition temperature or a Vicat softening temperature of the resin described above is higher than 50° C. and in which a melting point or a moldable temperature thereof is 230° C. or lower (refer to, for example, patent document 1) or a colorant prepared by coloring spherical fine particles made of a resin by a coloring substance selected from leuco dyes (refer to, for example, patent document 2).

However, in the aqueous inks shown in patent document 1 and patent document 2, the problem of color fading of the colorants with the passage of time is solved, and written or printed characters or images are decolored by a solvent such as acetone or with heating at 200° C. (an iron in the examples). Accordingly, they can not be readily decolored with heating by rubbing and the like, and problems are involved therein in terms of usability and versatility.

On the other hand, known as thermosensitive decolorable colorants prepared by using leuco dyes which can be decolored with heating by rubbing and the like are, for example, temperature-sensitive discolorable color-memory microcapsule pigments which constitute a homogeneous compatibilized composite comprising as essential components, three components of (a) an electron-donating coloring organic compound (a leuco dye, hereinafter the same shall apply), (b) an electron-accepting compound (a developer, hereinafter the same shall apply) and (c) specific esters and specific aryl alkyl ketones controlling coloring reactions of (a) and (b) described above and which show large hysteresis widths (ΔH) of 8° C. to 30° C. and 8° C. to 80° C. in a color intensity-temperature curve to exert a quasi-reversible heat discoloration characteristic (refer to, for example, patent documents 3 and 4).

Further, known as heat erasable writing instruments prepared by using the above microcapsule pigments are, for example, a heat erasable writing instrument filled with a temperature-sensitive discolorable color-memory ink composition which comprises at least a solvent, a resin and a microcapsule pigment containing therein a temperature-sensitive discolorable color-memory composition comprising a homogeneous comptabilized composite of (a) an electron-donating coloring organic compound, (b) an electron-accepting compound and (c) a reaction medium controlling a coloring reaction of (a) and (b) described above, wherein the microcapsule pigment described above shows a hysteresis width (ΔH) of 40° C. to 70° C. in a color intensity-temperature curve and which ink composition has a complete decoloration temperature (T4) of 45 to 95° C. and a color developing initiation temperature (T2) of 0° C. or lower and is changed in color from color to non-color (refer to, for example, patent document 5) and ball point pen type writing instruments filled with an aqueous ink composition for a reversible heat discolorable writing instrument which contains at least water and a reversible heat discolorable microcapsule pigment containing therein a reversible heat discolorable composition comprising (a) an electron-donating coloring organic compound, (b) an electron-accepting compound and (c) a reaction medium determining a temperature of initiating a coloring reaction of both compounds described above, wherein an average particle diameter of the reversible heat discolorable microcapsule pigment described above falls in a range of 2.5 to 4.0 μm and in which the particles having a particle diameter of 2.0 μm or less account for 30% by volume or less based on the whole microcapsule pigment and wherein the reversible heat discolorable microcapsule pigment described above has a complete color-developing temperature (t1) of −30 to 0° C. and a complete decoloration temperature (t4) of 50 to 95° C. in a color intensity-temperature curve (refer to, for example, patent document 6).

The thermosensitive decolorable ink compositions described in patent documents 3 to 6 described above contain in a microcapsule, a leuco dye which is an electron-donating coloring organic compound, a developer which is an electron-accepting compound, a crystalline substance and the like. In the above decoloration mechanism, the leuco dye and the developer are first dissolved in the molten crystalline substance, and the molten crystalline substance is crystallized with cooling to deposit the leuco dye and the developer. The leuco dye and the developer which are not in a molten state are interacted (neutralized) with each other to develop a color by opening of a lactone ring and the like in the leuco dye, and a toner staying in a color developing state is obtained. In the above toner staying in a color developing state, the crystalline substance is molten with heating by rubbing and the like to dissolve again the leuco dye and the developer, and therefore the leuco dye and the developer can not be interacted and stay in a decoloring state.

When heating by rubbing and the like is stopped, the toner is cooled down to room temperature, and the crystalline substance is crystallized; the leuco dye and the developer are deposited again and interacted, and they stay in a color redeveloping state. In order to prevent the above state, a substance generating thermal hysteresis is mixed with the crystalline substance to inhibit recrystallization thereof at room temperature. A melting point of the crystalline substance in the thermosensitive toner is room temperature or higher (for example, 60° C.), and the freezing point in recrystallization after melting is set to room temperature or lower (for example, −10° C.) to thereby prevent color redeveloping by cooling to room temperature.

Accordingly, the leuco dyes described in patent documents 3 to 6 described above stay in a decoloring state when the crystalline substance is molten and stay in a color developing state when it is solidified, and therefore the decoloring and color developing states are controlled by controlling (thermal hysteresis) melting and solidifying of the crystalline substance in conventional techniques.

In conventional thermosensitive decolorable ink compositions, however, a mechanism of controlling decoloring and color developing is to expand a thermal hysteresis of the crystalline substance, and therefore the problem that decolored drawn lines stored at a resolidifying temperature or lower of the crystalline substance are developed again in color is involved therein.

Also, color redeveloping can be prevented by expanding a width of thermal hysteresis, but the problem that color redeveloping at a lower temperature state can not be prevented is involved therein because effective substances are not found in the existing state and the crystalline substance is crystallized at some stage.

Further, in order to provide the crystalline substance with the thermal hysteresis described above, impurities have to be prevented from being mixed therein, and it is essential to microcapsulize the crystalline substance. At present, it is difficult to achieve microcapsulization with an average particle diameter of 20 μm or less, or even if the microcapsule having an average particle diameter of 20 μm or less can be produced, the production efficiency thereof is low. If the microcapsule having a large average particle diameter is used, the hue intensity is low or an amount of the crystalline substance molten for erasing drawn lines is increased, and therefore the problem that more energy is required for decoloration is involved therein.

Patent document 1: Japanese Patent Application Laid-Open No. 2001-271011 (claims, examples and others)
Patent document 2: Japanese Patent Application Laid-Open No. 2002-294104 (claims, examples and others)
Patent document 3: Japanese Patent Application Laid-Open Hei 7 No. 33997 (claims, examples and others)
Patent document 4: Japanese Patent Application Laid-Open Hei 8 No. 39936 (claims, examples and others)
Patent document 5: Japanese Patent Application Laid-Open No. 2006-63238 (claims, examples and others)
Patent document 6: Japanese Patent Application Laid-Open No. 2008-280440 (claims, examples and others)

OUTLINE OF THE INVENTION

Problem to be Solved by the Invention

In light of the problems on the conventional techniques described above, the present invention solves them, and an object of the present invention is to provide a thermosensitive decolorable ink composition which can readily be decolored with simple heating by rubbing and the like without using a microcapsule and is not developed again in color even after stored at very low temperature (−50° C. or lower) and which is excellent in stability with passage of time and has a vivid hue intensity.

Means for Solving the Problem

Intense studies repeated by the present inventors in light of the conventional problems described above have resulted in finding that a thermosensitive decolorable ink composition meeting the object described above is obtained by further adding a specific decolorant to a thermosensitive ink composition containing as a colorant, color developing particles comprising at least a leuco dye, a developer and a crystalline substance, and thus the present invention has come to be completed.

That is, the present invention comprises the following items (1) to (9).
(1) A thermosensitive decolorable ink composition containing as a colorant, color developing particles comprising at least a leuco dye, a developer and a crystalline substance, wherein the ink composition further contains a decolorant comprising an amorphous resin.
(2) The thermosensitive decolorable ink composition as described in the above item (1), wherein the amorphous resin is at least one selected from the group consisting of urethane resins, acryl resins, acrylonitrile resins, polystyrene, polybutadiene, polyvinyl chloride and mixtures, alloys and copolymers of those resins with polycarbonate.
(3) The thermosensitive decolorable ink composition as described in the above item (1) or (2), wherein the amorphous resin has a glass transition temperature (Tg) of 30 to 90° C.
(4) The thermosensitive decolorable ink composition as described in any one of the above items (1) to (3), wherein the decolorant comprises amorphous resin fine particles having an average particle diameter of 10 to 2000 nm.
(5) The thermosensitive decolorable ink composition as described in any one of the above items (1) to (4), wherein a content of the decolorant is 5 to 30% by mass based on the total amount of the ink composition.
(6) The thermosensitive decolorable ink composition as described in any one of the above items (1) to (5), wherein the color developing particles are contained in the ink in a crystalline state, and a melting point thereof is 40 to 150° C.
(7) The thermosensitive decolorable ink composition as described in any one of the above items (1) to (5), wherein the color developing particles are contained in the ink in a crystalline state, and a heat capacity thereof is 10 J/g or more.
(8) A writing instrument filled with the thermosensitive decolorable ink composition as described in any one of the above items (1) to (7).
(9) The writing instrument as described in the above item (8), wherein the writing instrument is a ball point pen or a marking pen.

Effect of the Invention

According to the present invention, provided are a thermosensitive decolorable ink composition which can readily be decolored with simple heating by rubbing and the like without using a microcapsule and is not developed again in color even after stored at very low temperature (−50° C. or lower) and which is excellent in stability with passage of time and suited to writing instruments and the like having a vivid hue intensity and a writing instrument filled with the above ink composition.

MODE FOR CARRYING OUT THE INVENTION

The embodiment of the present invention shall be explained below in detail.

The thermosensitive decolorable ink composition of the present invention contains as a colorant, color developing particles comprising at least a leuco dye, a developer and a crystalline substance, wherein the ink composition further contains a decolorant comprising an amorphous resin.

The colorant used in the present invention is constituted from the color developing particles comprising at least a leuco dye, a developer and a crystalline substance.

The leuco dye used in the present invention shall not specifically be restricted as long as it is an electron-donating dye and functions as a color former. To be specific, from the viewpoint of obtaining inks having an excellent color forming characteristic, it includes, for example, 3,3-bis(p-dimethylaminophenyl)-6-dimethylaminophthalide, 3-(4-diethylaminophenyl)-3-(1-ethyl-2-methylindole-3-yl)phthalide, 3-(4-diethylamino-2-ethoxyphenyl)-3-(1-ethyl-2-methylindole-3-yl)-4-azaphthalide, 1,3-dimethyl-6-diethylaminofluoran, 2-chloro-3-methyl-6-dimethylaminofluoran, 3-dibutylamino-6-methyl-7-anilinofluoran, 3-diethylamino-6-methyl-7-anilinofluoran, 3-diethylamino-6-methyl-7-xylidinofluoran, 2-(2-chloroanilino)-6-dibutylaminofluoran, 3,6-dimethoxyfluoran, 3,6-di-n-butoxyfluoran, 1,2-benzo-6-diethylaminofluoran, 1,2-benzo-6-dibutylaminofluoran, 1,2-benzo-6-ethylisoamylaminofluoran, 2-methyl-6-(N-p-tolyl-N-ethylamino)fluoran, 2-(N-phenyl-N-methylamino)-6-(N-p-tolyl-N-ethylamino)fluoran, 2-(3'-trifluoromethylanilino)-6-diethylaminofluoran, 3-chloro-6-cyclohexylaminofluoran, 2-methyl-6-cyclohexylaminofluoran, 3-methoxy-4-dodecoxystyrynoquinoline and the like, and they can be used alone (single kind) or in a mixture of two or more kinds thereof (hereinafter referred to simply as "at least one kind").

Further, pyridine base compounds, quinazoline base compounds, bisquinazoline base compounds and the like which develop a yellow color to a red color can be used as well.

The above leuco dyes have a lactone skeleton, a pyridine skeleton, a quinazoline skeleton, a bisquinazoline skeleton and the like, and the colors are developed by opening these skeletons (rings).

The developer used in the present invention is added for developing the leuco dye in color and constituted from particles staying in a crystalline state, and it is added to the ink in the above crystalline state.

From the viewpoint of obtaining the ink having an excellent color forming characteristic, the developer which can specifically be used includes, for example, o-cresol, tertiary butylcatechol, nonylphenol, n-octylphenol, n-dodecylphenol, n-stearylphenol, p-chlorophenol, p-bromophenol, o-phenylphenol, hexafluorobisphenol, n-butyl p-hydroxybenzoate, n-octyl p-hydroxybenzoate, resorcin, dodecyl gallate, 2,2-bis(4'-hydroxyphenyl)propane, 4,4-dihyroxyphenylsulfone, 1,1-bis(4'-hydroxyphenyl)ethane, 2,2-bis(4'-hydroxy-3-methylphenyl)propane, bis(4-hydroxyphenyl)sulfide, 1-phenyl-1,1-bis(4'-hydroxyphenyl)ethane, 1,1-bis(4'-hydroxyphenyl)-3-methylbutane, 1,1-bis(4'-hydroxyphenyl)-2-methylpropane, 1,1-bis(4'-hydroxyphenyl)-n-hexane, 1,1-bis(4'-hydroxyphenyl)-n-heptane, 1,1-bis(4'-hydroxyphenyl)-n-octane, 1,1-bis(4'-hydroxyphenyl)-n-nonane, 1,1-bis(4'-hydroxyphenyl)-n-decane, 1,1-bis(4'-hydroxyphenyl)-n-dodecane, 2,2-bis(4'-hydroxyphenyl)butane, 2,2-bis(4'-hydroxyphenyl)ethyl propionate, 2,2-bis(4'-hydroxyphenyl)-4-methylpentane, 2,2-bis(4'-hydroxyphenyl)hexafluoropropane, 2,2-bis(4'-hydroxyphenyl)-n-heptane, 2,2-bis(4'-hydroxyphenyl)-n-nonane and the like, and at least one of them can be used.

The crystalline substance used in the present invention dissolves the leuco dye and the developer in a molten state, and the above crystalline substance is crystallized by cooling (for example, 5 to 20° C.) to deposit the leuco dye and the developer to put them into a color forming state and a color developing state. The crystalline substance is molten with heating (for example, 60 to 80° C.) by rubbing and the like to dissolve again the leuco dye and the developer, and therefore the leuco dye and the developer can not be interacted to be in a decoloration state. When heating with rubbing and the like is stopped, the crystalline substance is cooled down to room temperature and crystallized, and the leuco dye and the developer are deposited again and interacted, and they are in a color redeveloping state.

The crystalline substance which can be used shall not specifically be restricted as long as it has the functions described above, and it includes, for example, compounds having at least one of polar groups such as a hydroxyl group, an ester bond, an ether bond, an amide bond, to be specific, saturated fatty acids such as decanoic acid (capric acid), dodecanoic acid (lauric acid), tetradecanoic acid (myristic acid), pentadecanoic acid, hexadecanoic acid (palmitic acid), heptadecanoic acid, octadecanoic acid (stearic acid), nonadecanoic acid, icosanoic acid, docosanoic acid, tetradocosanoic acid, hexadocosanoic acid, octadocosanoic acid, higher alcohols such as capryl alcohol, lauryl alcohol, myristyl alcohol, cetyl alcohol, stearyl alcohol, behenyl alcohol, isostearyl alcohol, palmitoleyl alcohol, amides of the fatty acids and amines: esters of the fatty acids and the alcohols each described above and ethers of the higher alcohols described above with glycerin, propylene glycol and ethylene glycol. Further, it includes aromatic compounds such as diphenylpropanedione, dibenzyloxybenzene, diphenoxybenzene, diisopropylnaphthalene, benzylbiphenyl, benzylnaphthyl ether, dibenzyl sulfoxide, dimethylterephthalate, diphenylcarbonate, diphenylsulfone, fluoranthene, fluorene, methylhydroxynaphthalate, phenylhydroxynaphthalate, steranilide, and at least one of them can be used.

The crystalline substance having a melting point of 40 to 90° C. is preferred from the viewpoint that stability of the drawn lines before rubbed and staying in an ink state can be further enhanced, and the crystalline substance which is a chain molecule having 13 to 20 carbon atoms and which has at least one of polar groups such as a hydroxyl group, an ester bond, an ether bond and an amide bond is more preferred from the viewpoint of obtaining stable color developing fine particles.

Desirably used as the preferred crystalline substance are, for example, stearic acid (melting point: about 70° C.), palmitic acid (melting point: 63° C.), stearamide (melting point: 104° C.), behenyl alcohol (melting point: 60° C.) and zinc stearate (melting point: 130° C.).

The colorant of the present invention is prepared by using the color developing particles comprising at least the leuco dye, the developer and the crystalline substance each described above, and it can be prepared by using, for example, a melting emulsification method as a preparing method thereof. The color developing particles can be prepared by, for example, blending the leuco dye, the developer, the crystalline substance, an emulsifier and water (ion-exchanged water and the like), heating the mixture, then stirring it under a condition of 60 to 95° C. by means of a kneader such as a high speed homogenizer and thereafter cooling (for example, cooling on ice) it.

The contents of the leuco dye, the developer and the crystalline substance are 0.8 to 3 of the developer and 1 to 5 of the crystalline substance based on 1 of the leuco dye in terms of a mass ratio.

In the colorant of the present invention, an optional color forming temperature and an optional decoloring temperature can be set by suitably combining the kinds and the amounts of the leuco dye, the developer and the crystalline substance each described above.

An average particle diameter of the color developing particles obtained is preferably 10 to 2000 nm, more preferably 80 to 300 nm from the viewpoint of a coloring property, a color forming property and easiness of decoloring. "The average particle diameter" prescribed in the present invention (including the examples and the like) is a value obtained by measuring an average particle diameter by means of a particle size distribution measuring equipment (Unimodal measurement (average particle diameter measurement)).

A melting point of the color developing particles comprising the leuco dye, the developer and the crystalline substance each described above is preferably 40 to 150° C., more preferably 60 to 130° C. from the viewpoint of thermal stability and easiness of decoloring of the ink.

Further, a heat capacity of the above color developing particles is preferably 10 J/g or more, particularly preferably 10 J/g or more and 500 J/g or less. If a heat capacity of the color developing particles is lower than 10 J/g, the decoloring action is exerted in a certain case by a slight temperature change in the environment. On the other hand, if it is higher than 500 J/g, the problem that an energy amount necessary for decoloration is too large to make it possible to decolor the drawn lines without repeating rubbing for a long time is brought about in a certain case.

A "melting point" of the color developing particles comprising the leuco dye, the developer and the crystalline substance each described above which is prescribed in the present invention (including the examples and the like) is a value obtained by measuring a dried residue of a color developing toner (emulsion) under a condition of heating at a rate of 10° C./minute by means of a differential scanning colorimeter (DSC8230L, manufactured by Rigaku Corporation), wherein a top temperature of an endothermic peak is set to "a melting point", and an endothermic peak area thereof is set to "a heat capacity".

In the present invention, a content of the colorant (color developing particles) is preferably 5 to 30% by mass, more preferably 10 to 20% by mass based on the total amount of the ink composition.

If a content of the colorant (color developing particles) is less than 5% by mass, the coloring strength and the color forming property are unsatisfactory. On the other hand, if it exceeds 30% by mass, a required amount of the decolorant corresponding thereto grows large, and a viscosity of the ink is increased to result in deterioration in the writing property. Accordingly, both are not preferred.

The decolorant used in the present invention comprises an amorphous resin. In decoloration action exerted by the above decolorant, lines (the colorant (color developing particles) staying in a color developing state) drawn by writing and the like are heated by rubbing and the like to allow the crystalline substance contained in the drawn lines to be molten, and the leuco dye and/or the developer contained therein are dissolved in the amorphous resin (particles), whereby they are put into a decoloration state to erase the drawn lines.

The amorphous resin which can be used shall not specifically be restricted as long as it is an amorphous resin which can exert the function described above, and it includes preferably at least one selected from urethane resins, acryl resins, acrylonitrile resins, polystyrene, polybutadiene, polyvinyl chloride and mixtures, alloys and copolymers thereof with polycarbonate from the viewpoint that the inks having a suited decoloration ability can be obtained.

The amorphous resin having a glass transition temperature (Tg) of 30 to 90° C. is more preferred from the viewpoint that the stability in an ink state can be further enhanced, and the amorphous resin having an average particle diameter of 10 to 2000 nm, particularly preferably 40 to 400 nm is preferred from the viewpoints that the decolorant can be prevented from settling down and that the stability in storing with the passage of time can be further enhanced.

The decolorant which can be used includes, in a case of the urethane resins, a commercial urethane resin emulsion (WBR-2019, manufactured by Taisei Fine Chemical Co., Ltd., Tg: 45° C., average particle diameter: 120 nm, total solid content: 32 wt %), in a case of the acryl resins, a commercial acryl resin emulsion (AE116, manufactured by JSR Corporation, Tg: 50° C., average particle diameter: 80 nm, total solid content: 40 wt %), in a case of the acrylonitrile resins, a commercial acrylonitrile resin emulsion (Nipol 1577, manufactured by Zeon Corporation, Tg: 46° C., average particle diameter: 40 nm, total solid content: 38 wt %), in a case of the polystyrene, a commercial polystyrene emulsion (2507H, manufactured by Zeon Corporation, Tg: 58° C., average particle diameter: 160 nm, total solid content: 35 wt %), in a case of the polybutadiene, a commercial polybutadiene emulsion (LX433c, manufactured by Zeon Corporation, Tg: 50° C., average particle diameter: 150 nm, total solid content: 30 wt %) and in a case of the polyvinyl chloride, a commercial polyvinyl chloride emulsion (Mowinyl 1720, manufactured by Nichigo-Mowinyl Co., Ltd., Tg: 55° C., average particle diameter: 150 nm, total solid content: 48 wt %).

A content of the above decolorants is preferably 5 to 30% by mass, more preferably 10 to 20% by mass based on the total amount of the ink composition.

If a content of the above decolorants is less than 5% by mass, the decoloring property is unsatisfactory. On the other hand, if it exceeds 30% by mass, a viscosity of the ink is increased, and the writing property is deteriorated. Accordingly, both are not preferred.

The thermosensitive decolorable ink composition of the present invention can suitably contain, in addition to the color developing particles comprising the leuco dye, the developer and the crystalline substance and the decolorant each described above, a fixing agent, a wetting agent and the like in terms of enhancing a fixing property of the drawn lines as long as the effects of the present invention are not damaged.

In the thermosensitive decolorable ink composition thus constituted according to the present invention, two components of the colorant (color developing particles) and the decolorant are essential. The color developing particles contain at least the leuco dye, the developer and the crystalline substance, and the crystalline substance is crystallized as is the case with the conventional art described above, whereby the leuco dye is interacted with the developer to turn to a color developing state. The crystalline substance is molten with heating by rubbing as is the case with the conventional art, and the leuco dye and the developer are dissolved therein to thereby turn to a decoloring state. However, the crystalline substance of the color developing particles in the present invention does not contain a material exerting a thermal hysteresis, and therefore when heating by rubbing and the like is stopped, the crystalline substance is cooled down to room temperature, whereby it is solidified again at almost the same temperature as a melting point thereof to develop again the color.

In the thermosensitive decolorable ink composition of the present invention, a component essential for maintaining a decoloring state is a decolorant. The decolorant used in the present invention has action of introducing therein the leuco dye and the developer which are dissolved in the molten crystalline substance and preventing interaction between the leuco dye and the developer to maintain a decoloring state even after cooled since the decolorant itself is not crystallized. To be specific, the amorphous resin described above is used as the decolorant.

The decoloring mechanism in the present invention does not depend on a thermal hysteresis of the crystalline substance, and decoloration is carried out by introducing the leuco dye and/or the developer from the crystalline substance into the amorphous resin. In the present decoloring mechanism, the amorphous resin into which the leuco dye and/or the developer are introduced (dissolved) is not crystallized with cooling, and therefore the color can be prevented from being developed again at very low temperature (for example, −30° C. or lower, further −50° C. or lower).

In the present invention, both of the color developing particles and the decolorant fine particles can be turned into fine particles (since they do not have to be protected by microcapsules), and it becomes possible to prepare the thermosensitive decolorable ink composition having a higher hue intensity and requiring a smaller decoloration energy.

Accordingly, in the present invention, obtained is the thermosensitive decolorable ink composition which can readily be decolored with simple heating by rubbing and the like without using a microcapsule and is not developed again in color even after stored at very low temperature (−50° C. or lower) and which is excellent in stability with passage of time and has a vivid hue intensity.

The thermosensitive decolorable ink composition of the present invention which is thus constituted and exerts functions is suitably filled in writing instruments such as aqueous ink ball point pens, gel ink ball point pens, marking pens and the like and can form drawn lines on a writing surface such as paper, and the drawn lines can readily be decolored with rubbing heat (for example, 60° C. or higher) generated by an eraser and the like installed at a rear end part of the writing instrument main body.

The writing instrument of the present invention is charged with the thermosensitive decolorable ink composition described above and can suitably be used as aqueous ink ball point pens, gel ink ball point pens, marking pens, brush pens and the like.

EXAMPLES

Next, the present invention shall be explained in detail with reference to examples and comparative examples, but the present invention shall not be restricted to the examples shown below.

Examples 1 to 5 and Comparative Examples 1 to 4

Example 1

A colorant liquid 1 was prepared by the following method.
CVL (Crystal Violet Lactone, leuco dye, manufactured by Yamada Chemical Co., Ltd.): 1 part by mass
Hexafluorobisphenol A (developer, melting point: about 130° C., heat capacity: 60 J/g, manufactured by Tokyo Chemical Industry Co., Ltd.): 1 part by mass
Behenyl Alcohol 80 (crystalline substance, melting point: 60° C., manufactured by Nikko Chemicals Co., Ltd.): 8 parts by mass
Sodium dodecylsulfate (emulsifier, manufactured by Wako Pure Chemical Industries, Ltd.): 1 part by mass
Ion-exchanged water: 89 parts by mass
The colorant liquid according to the formulation described above was heated at 80° C. for 2 hours.
Then, the colorant liquid was stirred at a high speed of 15,000 rpm for 10 minutes at 80° C. by means of a high speed homogenizer and then immediately cooled on ice to prepare a colorant liquid 1 (average particle diameter: 130 nm).
Next, a thermosensitive decolorable ink 1 was prepared by the following method.
Colorant liquid 1: 50 parts by mass
WBR-2019 (urethane resin emulsion, decolorant, manufactured by Taisei Fine Chemical Co., Ltd., Tg: 45° C., particle diameter: 120 nm, total solid content: 32 wt %, hereinafter the same shall apply): 40 parts by mass
Joncryl 61J (fixing agent, manufactured by BASF Japan Ltd.):
10 parts by mass
The above color developing particles prepared in Example 1 had a melting point of 70° C. and a heat capacity of 31 J/g.

Example 2

A colorant liquid 2 was prepared by the following method.
RED-500 (leuco dye, manufactured by Yamada Chemical Co., Ltd.): 1 part by mass
Hexafluorobisphenol A (developer, manufactured by Tokyo Chemistry Industry Co., Ltd.): 1 part by mass
Behenyl Alcohol 80 (crystalline substance, manufactured by Nikko Chemicals Co., Ltd.): 8 parts by mass
Sodium dodecylsulfate (emulsifier, manufactured by Wako Pure Chemical Industries, Ltd.): 1 part by mass
Ion-exchanged water: 89 parts by mass
The colorant liquid according to the formulation described above was heated at 80° C. for 2 hours.
Then, the colorant liquid was stirred at a high speed of 15,000 rpm for 10 minutes at 80° C. by means of a high speed homogenizer and then immediately cooled on ice to prepare a colorant liquid 2 (average particle diameter: 140 nm).
Next, a thermosensitive decolorable ink 2 was prepared by the following method.
Colorant liquid 2: 50 parts by mass
WBR-2019 (urethane resin emulsion, decolorant, manufactured by Taisei Fine Chemical Co., Ltd.): 40 parts by mass
Joncryl 61J (fixing agent, manufactured by BASF Japan Ltd.): 10 parts by mass
The above color developing particles prepared in Example 2 had a melting point of 70° C. and a heat capacity of 33 J/g.

Example 3

A colorant liquid 3 was prepared by the following method.
BLACK-202 (leuco dye, manufactured by Yamada Chemical Co., Ltd.): 1 part by mass
Hexafluorobisphenol A (developer, manufactured by Tokyo Chemical Industry Co., Ltd.): 1 part by mass
Behenyl Alcohol 80 (crystalline substance, manufactured by Nikko Chemicals Co., Ltd.): 8 parts by mass
Sodium dodecylsulfate (emulsifier, manufactured by Wako Pure Chemical Industries, Ltd.): 1 part by mass
Ion-exchanged water: 89 parts by mass
The colorant liquid according to the formulation described above was heated at 80° C. for 2 hours.
Then, the colorant liquid was stirred at a high speed of 15,000 rpm for 10 minutes at 80° C. by means of a high speed homogenizer and then immediately cooled on ice to prepare a colorant liquid 3 (average particle diameter: 140 nm).
Next, a thermosensitive decolorable ink 3 was prepared by the following method.
Colorant liquid 3: 50 parts by mass
WBR-2019 (urethane resin emulsion, decolorant, manufactured by Taisei Fine Chemical Co., Ltd.): 40 pats by mass
Joncryl 61J (fixing agent, manufactured by BASF Japan Ltd.): 10 parts by mass
The above color developing particles prepared in Example 3 had a melting point of 70° C. and a heat capacity of 30 J/g.

Example 4

A thermosensitive decolorable ink 4 was prepared by the following method.
Colorant liquid 1 prepared in Example 1: 50 parts by mass
AE116 (acryl resin emulsion, decolorant, manufactured by JSR Corporation, Tg: 50° C., average particle diameter: 80 nm, total solid content: 40 wt %): 40 parts by mass
Joncryl 61J (fixing agent, manufactured by BASF Japan Ltd.): 10 parts by mass

Example 5

A thermosensitive decolorable ink 5 was prepared by the following method.
Colorant liquid 1 prepared in Example 1: 50 parts by mass
Nipol 1577 (acrylonitrile resin emulsion, decolorant, manufactured by Zeon Corporation, Tg: 46° C., average particle diameter: 40 nm, total solid content: 38 wt %): 40 parts by mass
Joncryl 61J (fixing agent, manufactured by BASF Japan Ltd.): 10 parts by mass

Comparative Examples 1 to 3

Only the colorant liquids 1 to 3 prepared in Examples 1 to 3 described above were used alone as inks to prepare thermosensitive decolorable inks 6 to 8.

Comparative Example 4

A thermosensitive decolorable ink 9 was obtained by the following method.
An ink was taken out from a refill of "Frixion Ball Black" manufactured by PILOT Corporation and diluted to 50% by refined water, whereby a viscosity thereof was reduced, and the thermosensitive decolorable ink 9 was prepared.

Comparative Example 5

A thermosensitive decolorable ink 10 was obtained by the following method.
An ink was taken out from a sliver of "Frixion Line Blue" manufactured by PILOT Corporation to prepare the thermosensitive decolorable ink 10.

Writing instruments (collector type aqueous ink ball point pens (UB-150, product name: Uni-Ball Eye), manufactured by Mitsubishi Pencil Co., Ltd.) were filled with the thermosensitive decolorable inks 1 to 5 prepared in Examples 1 to 5 described above and the thermosensitive decolorable inks 6 to 10 prepared in Comparative Examples 1 to 5, and a color developing property, stability with passage of time, a decoloring property and restoring resistance of decolored drawn lines were evaluated by the respective evaluation methods described below. The results thereof are shown in the following Table 1.

Evaluation Method of Color Developing Property:
The writing instruments described above were used to write lines on a regular paper by hand, and a hue of the drawn lines was visually observed and evaluated according to the following evaluation criteria.
Evaluation Criteria:
○: no starving and writable, and a hue intensity is high
Δ: starving observed, and partially decolored
X: not writable
Evaluation Method of Stability with Passage of Time:
The drawn lines described above were stored under a condition of 40° C. for a week, and a hue of the drawn lines was visually observed and evaluated by comparison according to the following evaluation criteria.
Evaluation Criteria:
○: no hue change
Δ: partially decolored or a hue is reduced in the whole part
X: decolored and incapable of observing the drawn lines
Evaluation methods of a decoloring property exerted with heating by rubbing with an eraser and a restoring property at −50° C.:

The drawn lines were rubbed with an eraser prepared by the following method and evaluated according to the following evaluation criteria. Further, a paper having parts erased by the above eraser was stored in a freezer of −50° C. for 3 hours, and then a restoring property thereof was evaluated according to the following evaluation criteria.
Method of Preparing an Eraser:
A polypropylene resin (J-728, manufactured by Mitsui Chemicals, Inc.) 25 parts by mass and a styrene base thermoplastic elastomer (Actymer, LQA9770N, manufactured by Riken Technos Corporation) 75 parts by mass were molten with heating and sufficiently kneaded by means of a kneader, and the mixture was cooled and crushed. It was melt-extruded by means of an extruding machine, and then it was cooled and cut to obtain an eraser (size: 12×5×20 mm).
Evaluation Criteria of Decoloring Property Exerted with Heating:
○: decolorable, and the drawn lines are not observed
Δ: partially not decolorable or a faint hue remains in the whole part
X: not decolorable, and the drawn lines are not changed
Evaluation Criteria of Restoring Resistance of Decolored Drawn Lines at −50° C.:
○: decolored drawn lines are not changed and not restored
Δ: partially restored or a faint hue is restored in the whole part
X: drawn lines are restored and can be observed
-: drawn lines are not decolored with heating, and therefore restoring resistance of decolored drawn lines is not evaluated

TABLE 1

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Color developing property | ○ | ○ | ○ | ○ | ○ | ○ | ○ | ○ | ○ | ○ |
| Stability with passage of time | ○ | ○ | ○ | ○ | ○ | ○ | ○ | ○ | ○ | ○ |
| Decoloring property | ○ | ○ | ○ | ○ | ○ | X | X | X | ○ | ○ |
| Restoring resistance | ○ | ○ | ○ | ○ | ○ | — | — | — | X | X |

As apparent from the results shown in Table 1 described above, it has been found that the lines written with the inks prepared in Examples 1 to 5 are immediately decolored by rubbing with the eraser described above and are not developed again in color even after stored in a freezer of −50° C. for 3 hours and that they are excellent in a color developing property and stability with passage of time.

In contrast with this, it has been found that the lines written with the inks prepared in Comparative Examples 1 to 3 are decolored just for a moment by rubbing with the eraser described above but are developed again in color immediately after stopping rubbing.

Further, it has been found that in Comparative Examples 4 and 5, no problems are involved in the color developing property, stability with passage of time and the decoloring property but a hue of the decolored drawn lines is restored by storing in a freezer of −50° C. for 3 hours, and therefore a problem is involved in stability of the decolored drawn lines.

It has been found from the results described above that the lines written with the thermosensitive decolorable inks according to the present invention can be decolored with heat generated by rubbing and are not developed again in color even after stored at very low temperature and that they are excellent in a color developing property and stability with passage of time.

INDUSTRIAL APPLICABILITY

Obtained is a thermosensitive decolorable ink composition which can suitably be filled in writing instruments such as ball point pens, making pens and the like.

What is claimed is:

1. A thermosensitive decolorable ink composition containing as a colorant, color developing particles which are in a crystalline state and have a melting point of 40 to 150° C. and which comprise at least a leuco dye, a developer and a crystalline substance, wherein the ink composition further contains a decolorant comprising an amorphous resin.

2. The thermosensitive decolorable ink composition as described in claim 1, wherein the amorphous resin is at least one selected from the group consisting of urethane resins, acryl resins, acrylonitrile resins, polystyrene, polybutadiene, polyvinyl chloride and mixtures, alloys and copolymers of those resins with polycarbonate.

3. The thermosensitive decolorable ink composition as described in claim 1, wherein the amorphous resin has a glass transition temperature (Tg) of 30 to 90° C.

4. The thermosensitive decolorable ink composition as described in claim 1, wherein the decolorant comprises amorphous resin fine particles having an average particle diameter of 10 to 2000 nm.

5. The thermosensitive decolorable ink composition as described in claim 1, wherein a content of the decolorant is 5 to 30% by mass based on the total amount of the ink composition.

6. The thermosensitive decolorable ink composition as described in claim 1, wherein the color developing particles are contained in the ink in a crystalline state, and a specific latent heat thereof is 10 J/g or more.

7. A writing instrument filled with the thermosensitive decolorable ink composition as described in claim 1.

8. The writing instrument as described in claim 7, wherein the writing instrument is a ball point pen or a marking pen.

* * * * *